United States Patent [19]

Monard

[11] Patent Number: 4,910,615

[45] Date of Patent: Mar. 20, 1990

[54] CAPACITANCE SENSOR FOR DETECTING THE POSITION OF MAGNETIC ROTATING HEADS

[75] Inventor: Paul Monard, Bourg-la-Reine, France

[73] Assignee: Schlumberger Industries, Montrouge, France

[21] Appl. No.: 136,483

[22] Filed: Dec. 21, 1987

[30] Foreign Application Priority Data

Dec. 19, 1986 [FR] France .................... 86 17789

[51] Int. Cl.$^4$ .................... G11B 21/02; G11B 5/53
[52] U.S. Cl. .................... 360/75; 360/109; 360/77.13
[58] Field of Search .................... 360/10.2, 70, 75, 10.3, 360/77.12, 77.13, 77.14, 77.15, 77.16, 77.17, 84, 85, 107, 109; 324/61 R, 61 P

[56] References Cited

U.S. PATENT DOCUMENTS

| | | |
|---|---|---|
| 3,783,196 | 1/1974 | Stanley . |
| 4,163,994 | 8/1979 | Sakamoto et al. .............. 360/77.16 |
| 4,183,060 | 1/1980 | Barnette . |
| 4,404,605 | 9/1983 | Sakamoto ........................ 360/77.17 |
| 4,412,259 | 10/1983 | Hiraguri ........................... 360/77.13 |
| 4,471,392 | 9/1984 | Zorbalas . |

FOREIGN PATENT DOCUMENTS

| | | |
|---|---|---|
| 0197663 | 10/1986 | European Pat. Off. . |
| 2345050 | 10/1974 | France . |
| 2344912 | 10/1979 | France . |
| 2427660 | 12/1979 | France . |
| 2458125 | 12/1980 | France . |
| 2512247 | 3/1983 | France . |
| 2021891 | 12/1979 | United Kingdom . |
| 1580008 | 11/1980 | United Kingdom . |

OTHER PUBLICATIONS

"Slider Assembly with Dynamically Positionable Transducer", *Research Disclosure*, No. 264 (Apr. 1986): 214, 215, Emsworth, Hampshire.
"Capacitive Height Control for Maintaining a Magnetic Head Closely Spaced from a Magnetic Layer", *Research Disclosure*, No. 206 (Jun. 1981): 242, 243, Havent, Hampshire, England.
Klaassen, "Capacitive Servo Detector", IBM Technical Disclosure Bulletin, vol. 26, No. 6 (Nov. 1983): 2942–2946.

*Primary Examiner*—Robert L. Richardson
*Assistant Examiner*—Steven R. Garland
*Attorney, Agent, or Firm*—Sanford J. Asman

[57] ABSTRACT

A device for detecting the position of a recording/read head (20) for use with a magnetic tape, the head being fixed to the free end of an elongate support (14) fixed to a component (5) which is mounted to rotate in a slot (4) provided in an equatorial plane of a cylindrical drum (1) on whose outside surface the recording tape is wound helically. Said support is capable of bending in a direction (f) which is transverse to the direction of relative head-to-head tape displacement. The device is characterized in that it includes a position sensor comprising a variable electrical capacitance including a fixed plate (32) fixed to the drum (1) of the moving plate (24) fixed to said head support, together with measurement means (33, 34, 35$_i$) which are sensitive to said capacitance and are suitable for providing a signal representative of the position of the head support (14) and thus of the head (20).

13 Claims, 5 Drawing Sheets

CAPACITANCE SENSOR FOR DETECTING THE POSITION OF MAGNETIC ROTATING HEADS

The present invention relates to a device for detecting the position of a recording/reading head, e.g. a magnetic head, and is applicable to apparatus for recording and/or reading data by means of a head having a data medium moving relative thereto, for example a magnetic tape.

FIELD OF THE INVENTION

The invention is applicable to recording/reading apparatus of conventional type having rotating heads, in which the tape is wound helically along an omega-shaped or an alpha-shaped path (as seen from above) around a cylindrical drum which has a central slot in an equatorial plane and which has a disk-shaped element rotating inside with a set of magnetic heads being disposed around the periphery of the disk, said heads projecting slightly beyond the wall of the drum. The rotary motion of the heads and the lengthwise motion of the tape give rise to data being disposed on the tape in a sequence of parallel tracks which are inclined relative to the longitudinal axis of the tape.

The angle at which the tracks on the tape are inclined is a function of the relative speed between the heads and the tape. The data recorded on the tape must therefore be read at the same relative speed as applied during recording, otherwise the heads do not track the tracks which are disposed on the tape at a constant standardized angle of inclination. In order to obtain identical relative speeds during recording and during reading, the speed of the tape and/or the speed of head rotation and/or the axial position of the head relative to the tape on either side of the equatorial plane of rotation of the rotary disk can all be varied.

However, in order to displace the head axially so as to bring it into a given position relative to the tape it is necessary to know the actual position of the head accurately at any moment so as to servocontrol the head displacement means as a function of the real position of the head, with said means being constituted, for example, by a cantilevered piezoelectric bimorph strip whose free end carries the head.

BACKGROUND OF THE INVENTION

Several devices already exist for the purpose of detecting the position of a magnetic head in a recording/reading apparatus.

A first prior detector device is described in published French patent application No. 2.458.125, for example, and comprises strain gauges disposed on the head-carrying piezoelectric strip for the purpose of detecting and measuring strip deformation, and thereby determining the position of the head.

This device is relatively complicated to implement given the difficulty of placing strain gauges on the strips.

Further, published French patent application No. 2.512.247 describes a device disposed inside the rotary head-carrying disk and including a coil which is fixed to the disk and which surrounds a ferrite core which is fixed to the head. The coil is connected to a capacitor so as to constitute an oscillator circuit whose frequency of oscillation is determined by the position of the core in the coil, and thus by the position of the head relative to the rotary disk.

This device is relatively bulky and it requires a relatively thick rotary disk, thereby giving rise to various mechanical stresses and difficulties.

Published French patent application No. 2.427.660 describes a device for controlling the position of a piezoelectric element which takes account of the hysteresis effect, and device including an oscillating branch in which said element is itself used as a capacitor.

This prior device is relatively complex given the necessary electronic circuitry.

Proposals have also been made, as is known, for a different type of device (see for example published French patent application No. 2.345.050), in which the deformation and the vibrations of a piezoelectric bimorph strip (carrying the head) are detected by means of the electrical signals delivered by the bimorph strip by virtue of the inverse piezoelectric effect. The top of the strip is constituted by a first conductive layer for controlling strip deformation, and the bottom of the strip is constituted by a second conductive (which is separated from the first by a dielectric layer) for generating of signals representative of deformation.

This prior structure gives rise to a bimorph strip which is complex in structure.

Published French patent application No. 2.344.912 shows a device in which the alignment between the main recording/reading head and the tracks on the tape is corrected by means of two lateral detector heads disposed on either side of the main head on the same piezoelectric strip. The differences in the amplitudes of the signals detected by said lateral heads constitutes an indication of the position of the main head relative to the tracks.

This prior device requires two additional magnetic heads to be provided and this not only increases the price but also gives rise to assembly difficulties and to considerable bulk.

In addition, most of the above-described prior devices share the drawbacks of providing a relative measurement only in that the measurement is performed relative to the element which carries the head. Further, these prior devices require additional electrical connections to be provided between the fixed portion of the drum and the rotating disk, thereby increasing the cost and the bulk of the recording/reading apparatus.

It will readily be understood that there is a desire for a device capable of detecting the axial position of a rotating recording/reading head running past a tape, with the device being simple and compact (compactness is important given that the heads and their control members are located in a small volume where space is at a premium), and capable of performing absolute measurements, i.e. of providing measurements with reference to a fixed element in order to increase the accuracy and the reliability of measurement.

Further, in a different application relating to apparatus for recording and reading video-type disks, as described by U.S. Pat. No. 3,783,196, there exists a device in which the read head has contact means enabling it to track a spiral groove provided in the disk, with variable height bumps disposed at the bottom of the groove constituting data. The device detects the variable distance between the tops of the bumps and the head while the head remains at a constant height. Detection is based on the principle of variation in the capacitance between a first electrode fixed to the head and a second electrode connected to the turntable.

Further, U.S. Pat. No. 4,183,060 described apparatus for recording and reading optically on a video type disk, the apparatus comprising a capacitive probe having its first electrode connected to a lens which is to be maintained at a constant distance from the disk which itself carries the second electrode, with said distance being maintained constant in spite of axial displacements of the surface of the disk as the disk rotates. Two resonant circuits are provided with the sum of the output signals therefrom constituting a position error signal.

These last two prior devices, in addition to being relatively complex because they use oscillating electronic circuits in order to obtain an output signal that varies in frequency, also relate to a field in which the problem to be solved is expressed in terms that are different from those applicable to recording on and reading from a tape.

These prior devices differ in particular in the nature of the data medium, i.e. in the present invention the data medium is one side of a flexible tape which does not lie in a plane, and which has data recorded on tracks which are mechanically indistinguishable, whereas in these prior devices the data is recorded on a plane rigid disk and the data is findable because of the groove.

Further, the respective utilizations are different. The device described in U.S. Pat. No. 4,183,060 provides a "zero" measurement which relates only to tiny variations in head displacement from a fixed reference position, while the device described in U.S. Pat. No. 3,783,196 performs measurements relating to the signal that conveys the data itself, whereas for recording and/or reading tape the important information lies in the absolute position of the head which position may vary over a relatively wide range.

Preferred embodiments of the present invention remedy the above-mentioned prior art drawbacks and provide a detection device which is compact and simple in design.

SUMMARY OF THE INVENTION

To this end, the device according to the invention includes the improvement whereby it includes a variable electrical capacitance position sensor comprising a fixed plate fixed to the drum and a moving plate fixed to the head support, together with measurement means responsive to capacitance and suitable for providing a signal representative of the position of the head support, and thus of the head.

Thus, the device in accordance with the invention measures the axial displacement of a rotary head in a manner which is simple and compact. In addition, the measurement is an absolute measurement.

According to a first aspect of the invention, the support comprises a piezoelectric bimorph strip having one of its faces constituting the moving plate of the variable capacitance.

The technique of axially displacing heads by a piezoelectric bimorph strip is widely used in conjunction with rotating heads. The invention is particularly suitable for this type of embodiment since it does not require any electrodes to be added to the transducer, thereby avoiding constraints of bulk and electrical insulation which are related to adding any such electrode.

In addition, and advantageously, by transmitting the signals applied to the moving plate or received from the moving plate via the means for transmitting the bending signal to the bimorph strip, there is no need to provide any additional electrical connections.

According to a second aspect of the invention, the device comprises a plurality of head supports angularly distributed around the rotating component and each carrying one head, the fixed plate then being common to all of the variable capacitances.

In order to obtain a reliable measurement which is as insensitive as possible to interference signals, synchronous amplitude demodulation is applied to an alternating input "carrier" electrical signal as generated by a generator which is connected firstly to one of the inputs of the demodulator means and secondly to one of the plates of the variable capacitor via an amplifier, with the other input of the demodulator means being connected to the other plate of the variable capacitor.

In a simple embodiment of the invention, the fixed plate is constituted by an annular metal layer which is coaxial with the drum and which is disposed over one of the bottom or top faces of the slot facing the path of the rotary head support.

In a first embodiment, the generator generates as many different frequency detection signals as there are head supports (such as piezoelectric bimorph strips) and each of these signals is applied to a respective one of the supports, with the demodulation means including a demodulation circuit for each support. Thus, each variable capacitance (i.e. each support) corresponds to a given carrier frequency.

In accordance with a second embodiment, the fixed plate is constituted by an annular succession of arcs having the same number of arcs as there are supports, said arcs being coaxial with the drum, each subtending the same angle at the center, and being disposed end-to-end, with the generator delivering a carrier signal at a given frequency, and the measurement means including a demultiplexing circuit for demultiplexing the signals coming from each of the annular arcs. The use of a single carrier frequency input signal simplifies the transmission of said signal and the transmission of the bending signal. The data relating to each support is then distinguished by the physical separation of the fixed plate as a plurality of different annular arcs, each of which delivers a signal containing information about the support facing it at any given instant.

In a third embodiment, the generator generates a carrier signal at a given frequency and is connected to the fixed plate, and the demodulation means include as many demodulation circuits as there are supports.

It is preferable in this third embodiment when the signals applied to or received from the moving plate are transmitted via the means for transmitting the support bending signal, and are at a different frequency therefrom, for the measuring means to include a frequency multiplexing circuit making it possible to transmit the bending signal to the support in one direction via the bending signal transmission means and to transmit the output signal from the moving plate which contains the corresponding position data in the opposite direction, again via the bending signal transmission means to the corresponding demodulation circuit.

This variant is particularly simple both from the mechanical point of view and from the electronic point of view.

Advantageously, each demodulation circuit comprises an amplifier connected to one input of a multiplier whose other input receives the carrier input signal and whose output is connected to a lowpass filter which is itself connected to a multiplicative inverter for obtain a reciprocal signal.

Preferably, the measurement means comprise a 90° phase shift circuit having the carrier input signal or the modulated output signal applied thereto.

In order to take account of variations in the permitivity of ambient air, the device may include a correction circuit comprising a reference capacitance placed in a vicinity of the variable measuring capacitance with said circuit being connected to the measuring means so as to deliver a correction signal thereto.

Preferably, the device in accordance with the invention is incorporated in a servocontrol circuit connecting the control means to the head supports.

BRIEF DESCRIPTION OF THE DRAWINGS

Embodiments of the invention are described by way of example with reference to the accompanying drawings, in which.

MORE DETAILED DESCRIPTION

Figure 1:
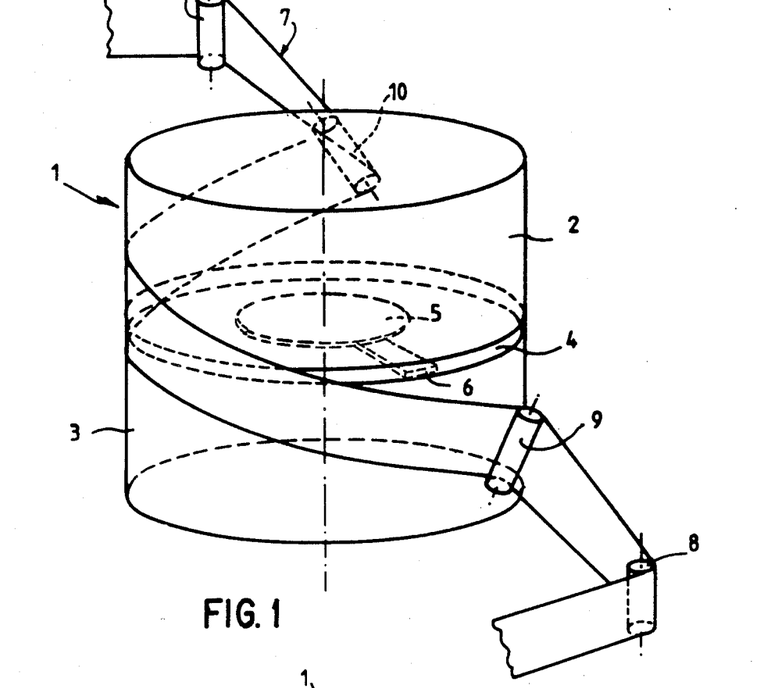
FIG. 1 is a diagrammatic perspective view of a tape wound in an omega-shape around a drum.
Figure 2:
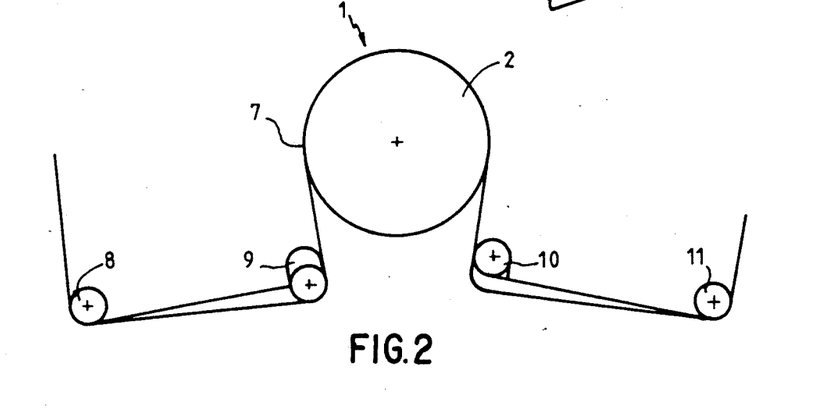
FIG. 2 is a plan view of the FIG. 1 assembly.

A device in accordance with the present invention is described below with reference to an example application relating to recording/reading apparatus using rotary magnetic heads and of a type which is known per se, such as that shown in FIGS. 1 and 2.

A cylindrical drum 1 has a top portion 2 and a bottom portion 3 which are separated by a slot 4 which is disposed substantially in an equatorial plane extending perpendicularly to the axis of the drum and halfway up the drum. A disk-shaped element 5 is provided in the slot and is suitable for being rotated about the drum axis. The disk carries one, and generally several, magnetic heads 6 which are regularly disposed around its periphery and which project very slightly beyond the surface defining the wall of the drum. A magnetic tape 7 is suitable for being wound helically about the drum 1 in order to form an omega-shape when seen from above, as shown in FIG. 2. A set of rolls 8 to 11 guide the tape 7 and keep it in this omega shape while it runs longitudinally from a pay-out spool to a take-up spool (not shown but known, per se). Data is recorded/read on the tape in track segments which are mutually parallel and which are disposed obliquely relative to the tape axis.

Figure 3:
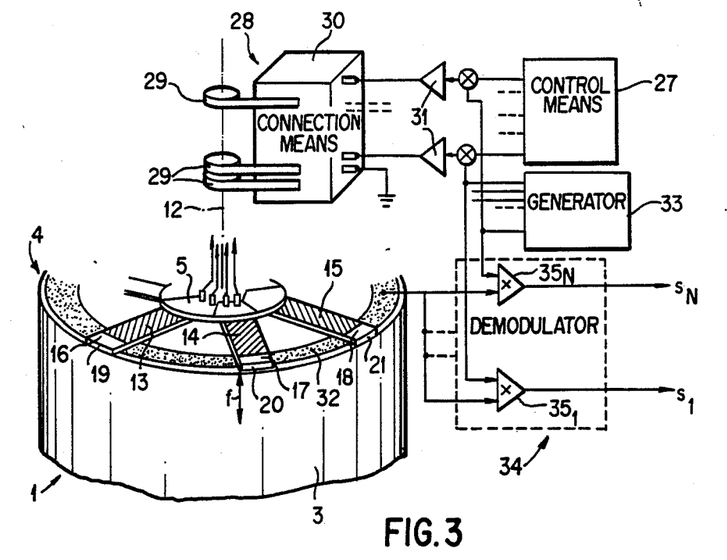
FIGS. 3, 4, and 5 are diagrammatic perspective views of three respective embodiments of the invention.
Figure 4:
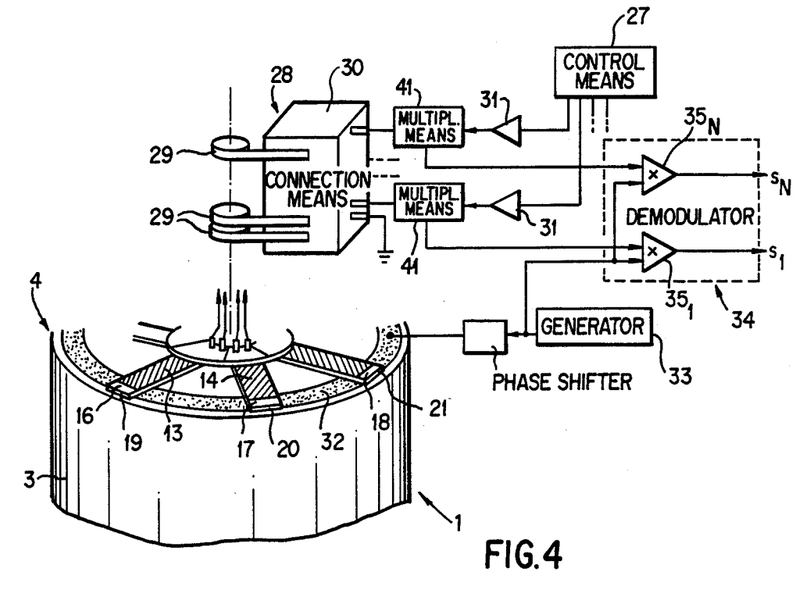
Figure 5:
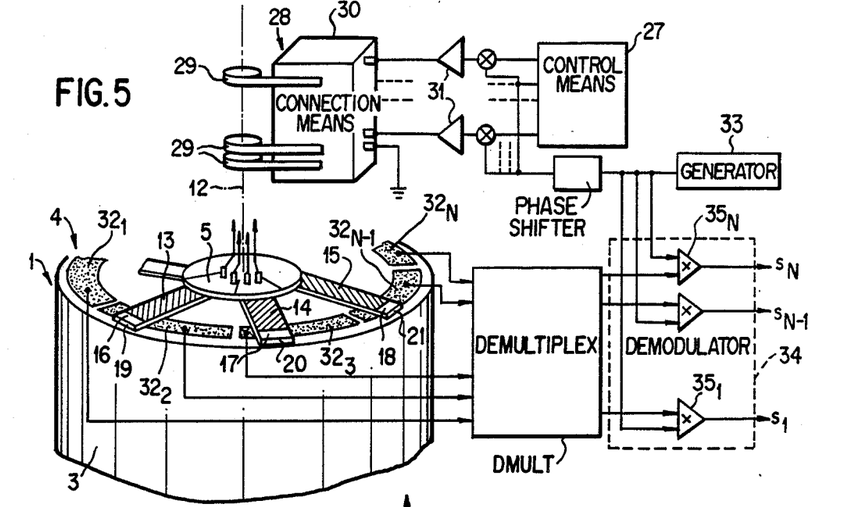

FIGS. 3 to 5 show three respective embodiments of the invention, and similar items in these figures have the same reference numerals in all of them. For reasons of clarity, only the bottom portion 3 of the drum 1 is shown in any of them.

A disk-shaped element 5 having a plurality of elongate supports 13, 14, and 15 disposed radially at angular intervals (which are preferably uniform) is rotatably mounted about the axis 12 of the drum in its central slot 4 between its top and bottom portions. The device includes six or eight supports, for example, but only the supports 13, 14, and 15 are visible in FIGS. 3 to 5. The free end of each support, i.e. the end thereof further from to the axis 12, is provided with a respective tab 16, 17, or 18. A respective magnetic head 19, 20, or 21 is fixed on each tab in such a manner as to ensure that the heads project radially relative to the outside surface of the drum in order to come into contact with the tape wound over the drum. One support is provided in this way per head.

The magnetic heads are capable of being displaced axially in a direction which is transverse to their plane of rotation and to the axis of the tape (i.e. a direction parallel to the axis 12 of the drum) as symbolized by an arrow f, thereby enabling the heads to track the parallel inclined data-carrying tracks on the tape.

Figure 6:
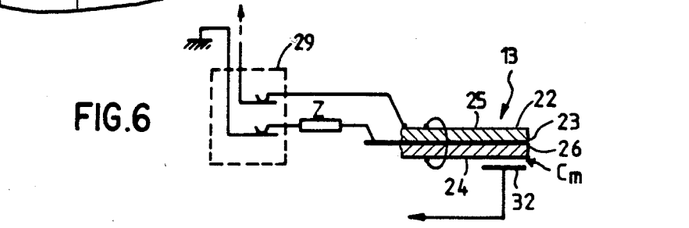
FIG. 6 is a diagram of a bimorph strip.

In conventional manner, the axial motion of each head is provided by bending the corresponding head support in the axial direction. To this end, and as shown by way of example in the figures, each support is constituted by a bimorph strip. Each strip (as shown in FIG. 6) comprises three parallel conducting layers 22, 23, and 24 which are separated in pairs by strips 25 and 26 of piezoelectric material. The central layer 23 is connected to ground via an impedance Z, while the top and bottom layers 22 and 24 are connected to each other and receive a bending signal such that the superposed piezoelectric strips are subjected by said signal respectively to an elongation and to a retraction, thereby causing the strip to bend.

Each strip receives a bending signal as generated by control means 27 and transmitted in conventional manner to said strip via a transmission assembly 28 comprising rotary contacts 29 (with one more rotary contact than there are strips), and via a connection circuit 30 and high tension amplifiers 31. For example, the bending signals may be at a frequency of about 60 Hertz to 500 Hertz and at an amplitude of 100 volts to 200 volts.

The embodiments of devices in accordance with the invention for providing the real axial position occupied by each magnetic head at any instant and as shown in the drawings are described below in detail.

The device in accordance with the invention comprises, for each bimorph strip, a variable capacitance position sensor provided with a moving plate capable of moving relative to a fixed plate which establishes an axial reference position for detecting the position of the bimorph strip.

The moving plate is constituted by the piezoelectric bimorph strip itself, and more precisely by one of the outer metallic faces thereof, while the fixed plate 32 is constituted by a plane annular conducting layer centered on the axis 5 of the drum and disposed on one of the bottom or top right cross-sections of the drum facing the slot 4 (see FIGS. 3 and 4). Thus, as they rotate, the strips 13, 14, and 15 are always facing the annular conducting layer 32 which constitutes the fixed plate.

It will be understood that any axial bending of a bimetallic strip under the effect of a given bending signal causes the strip to move away from or towards the fixed annular plate 32, thereby changing the variable measurement capacitance $C_m$ provided by said plates.

It should be observed that the fixed plate 32 is common to all of the variable capacitances $C_m$ formed by the association of a bimorph strip and the fixed plate. In FIGS. 3 to 5, the annular layer 32 is deposited on the bottom right cross-section of the drum facing the slot. It therefore faces the bottom conducting face of each bimorph strip. In a variant, the annular layer 32 could be fixed on the top right cross-section of the drum so as to be disposed above the bimorph strips.

The measuring means associated with each variable capacitance capacitor, i.e. each fixed plate and bimorph strip pair, are described below and serve to measure the measurement capacitance $C_m$ constituted in this way.

The device in accordance with the invention is based on the principle of measuring the amplitude of an amplitude modulated signal by synchronous demodulation in order to reduce the effect of interference signals. An alternating input signal is injected to one of the plates, said signal being referred to as a detection signal in order to distinguish it from the bending signal, and being also referred to below as the carrier input signal, since its frequency "$f_p$" acts as a carrier frequency, i.e. $V = V_p \sin 2\pi f_p t$. An input alternating electrical signal is applied to one of the plates of the measurement capacitance and a modulated output signal is received from the other plate, said other plate being connected to ground via a resistive impedance referenced Z. Each measurement capacitance $C_m$ is constituted by a bimorph strip and the fixed reference plate 32.

The output detection signal (or the modulated output signal as opposed to the carrier input signal) has an amplitude expressed as follows:

(I) $V_s = v_p \cdot Z/(Z + 1/(w_p C_m))$ where $w_p = 2\pi f_p$, and $C_m$ is a function of "$d$", i.e. the distance between the plates of each capacitance, such that $V_s$ if of the form:

(II) $V_s = f(d) \cdot V_p$ where f(d) is the function of "d" referred to above.

Figure 11:
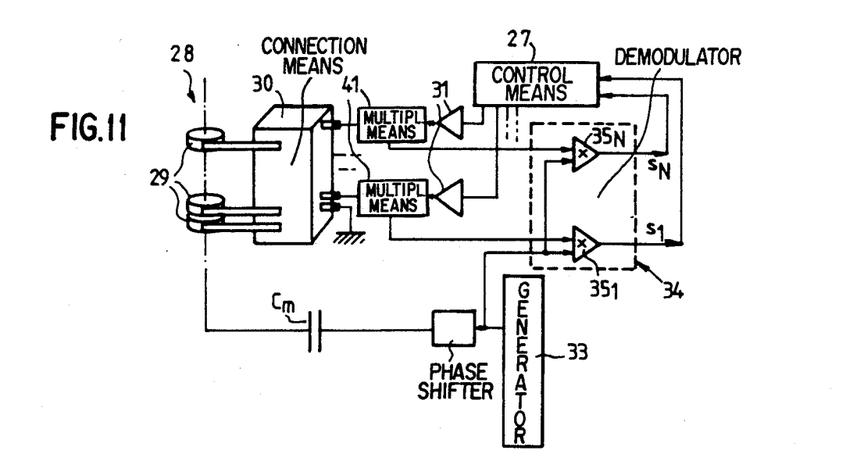
FIG. 11 is a diagram showing a servocontrol loop including a sensor in accordance with the invention.

The amplitude of the output signal is measured and that makes it possible to calculate "d" which represents the position of the magnetic head. With reference to FIGS. 3 to 6 and 8, the measurement means include a generator 33 which generates a carrier input signal as applied to one of the plates, together with demodulation means 34 which have one input receiving the carrier input signal and which have another input receiving the modulated output signal coming from the other plate. The demodulation means 34 comprise a demodulation circuit $35_1, \ldots, 35_N$ for each bimorph strip; each demodulation circuit $35_i$ ($i = 1, \ldots, N$) comprises a two-input multiplier 36 having inputs $e_1$ and $e_2$ which are respectively connected to the generator $33_i$ and via an amplifier 37 to one of the plates of the variable measurement capacitor $C_m$ (see FIG. 8). The output from multiplier 36 is connected to a lowpass filter 38 whose output is connected to an analog multiplicative inverter 39 which serves to deliver an output signal which is the reciprocal of its input signal, and which is itself followed by an amplifier 40. The output $s_i$ provides a final signal representative of the position of the bimorph strip relative to the fixed annular plate 32. Preferably, each final signal is applied to the control means 27 in order to constitute a feedback loop, as shown in FIG. 11.

FIGS. 3 to 5 show three respective embodiments whose specific features are now described.

In the first embodiment as shown in FIG. 3, the generator 33 generates N carrier input signals (where N is the number of bimorph strips) at different carrier frequencies, which are applied to each of the N bimorph strips, which also receive bending signals from the control means 27 via the high tension amplifiers 31, the connection circuits 30 and the rotary contacts 29. The N carrier input signals are also applied to respective ones of the first inputs of each of the demodulation circuits $35_1$ to $35_N$ whose second inputs each receive one of the N modulated output signals coming from the fixed annular plate 32. For example, the N carrier frequencies may be at frequencies of a few hundreds of kHz.

In a second embodiment, as shown in FIG. 4, the generator 33 generates carrier input signals at a single frequency which are applied to the first inputs of each of the circuits 34 and also to the fixed annular plate 32 via a 90° phase shifter DPHI. The output signals taken from each moving plate (each of the bimorph strips) are transmitted to respective second inputs 21 of the circuits $34_i$ via the rotary contacts 29 and the connection circuits 30 and via multiplexing circuits 41 whose function is described below. Thus, the bending signals from the control means 27 are transmitted to the bimorph strips in one direction whereas the detection signals coming from the modulated carrier frequency are transmitted from the bimorph strips in the opposite direction.

This second embodiment gives an optimum compromise between simplicity in structure from the mechanical and the electronic points of view and avoids simultaneously transmitting a plurality of different signals over a common line (bending signals and detection signals).

The frequency multiplexing by the circuit 41 is described below with reference to FIGS. 7A and 7B each of which shows an electronic circuit corresponding to the FIG. 4 device and a measurement capacitance $C_m$, i.e. a bimorph strip. It should be understood that each bimorph strip has a circuit as shown in FIG. 7A corresponding thereto, except for the control means 27 and the generator 33 which are common to all of the bimorph strips.

Figure 7A:
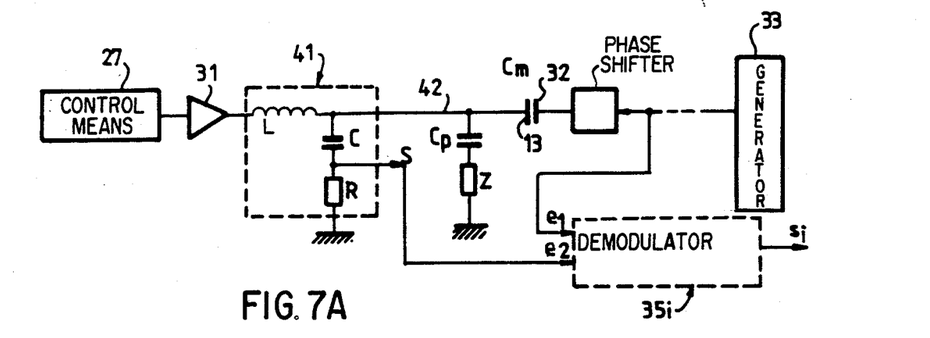
FIG. 7A is the equivalent electrical circuit of the FIG. 4 assembly.

With reference to FIG. 7A, the measurement capacitance $C_m$ receives a carrier input signal from the generator 33 on a first plate corresponding to the fixed plate 32 and conveyed via one of the phase shifters DPHI. The other plate of the capacitance $C_m$, corresponding to the moving plate (i.e. the bimorph strip 13) is connected firstly to a frequency multiplexing circuit 41 via a line 42 and secondly to a grounded line including a capacitance $C_p$ (representative of the inherent capacitance of the bimorph strip and having a value of about 10 nF) and an impedance Z. The circuit 41 is constituted by a coil L which receives the bending signal from the control means 27 via the high tension amplifier 31 and which is connected to an RC filter whose midpoint which delivers the modulated signal is connected to a first input of the demodulation circuit $35_i$. The second input of the demodulation circuit $35_i$ is connected to the generator 33. It is assumed that the bending signal is at a frequency of 500 Hz and at a voltage of about 150 volts, and that the carrier detection signal has a frequency of 250 kHz. By way of example, L = 10 mH, R = 10 kilohms, C = 680 pF, and Z = 10 kilohms.

The coil L has low impedance at 200 Hz and high impedance at 250 kHz. The bending signal at a relatively high tension does not reach the circuit $35_i$ because of the RC filter. It should be observed that the impedance Z prevents the line 42 from being grounded.

Figure 7B:
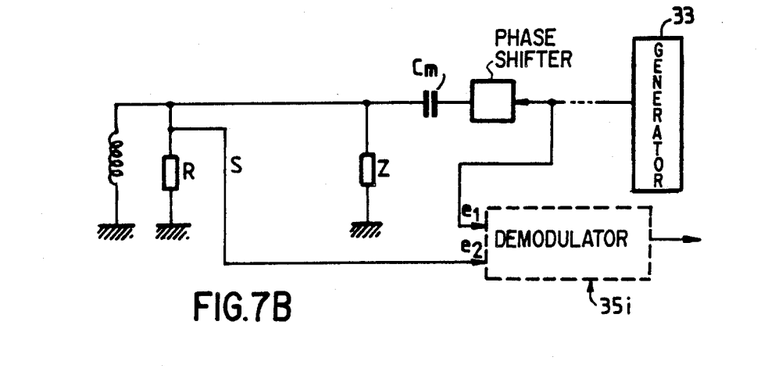
FIG. 7B is an equivalent electrical circuit similar to FIG. 7A, but for a carrier signal at a frequency of 250 kHz.
Figure 8:
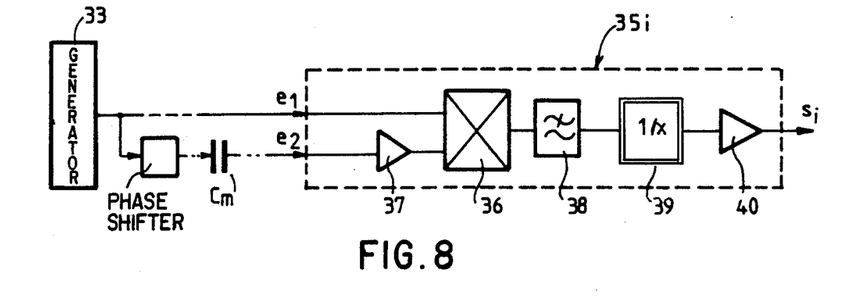
FIG. 8 is a block diagram of the demodulation circuit associated with a variable capacitance.

FIG. 7B is a diagram equivalent to the diagram of FIG. 7A but applicable to the carrier detection signal at 250 kHz. C and $C_p$ are considered as being short circuits, since the corresponding terms $1/wC$ and $1/wC_p$ are negligible with respect to R and Z, respectively. The coil L is grounded and presents a high impedance compared with R in parallel with Z (R ∥ Z). Puting $Z_{eq} = R \parallel Z$, the modulated output signal "V" coming from the moving plate (the bimorph strip) and delivered to the output of the circuit 41 is of the form:

(III) $V = A_p \cdot \sin(w_p t) \cdot Z_{eq}/(Z_{eq} + 1/(jw_p C_m))$ where $w_p$ corresponds to the frequency of the carrier input signal and $A_p$ is the amplitude of the carrier signal. Assuming that $Z_{eq} \cdot C_m \cdot w_p << 1$ (given the relative values of these magnitudes), a modulated output signal is obtained as follows:

(IV) $V = A_p \cdot \sin(w_p t) \cdot Z_{eq} jw_p \cdot C_m$ which is injected into the circuit $35_i$; its amplitude is:

(V) $A(V) = A_p \cdot Z_{eq} \cdot w_p \cdot C_m = A_p \cdot Z_{eq} \cdot (\epsilon \cdot S/d) \cdot w_p$ where
ε: permitivity of air
S: facing area of capacitance plates
d: distance between the plates.

The multiplicative inverter element 39 in each demodulation circuit $35_i$ (see FIG. 8) provides the reciprocal of the received signal in order to deliver a signal whose amplitude is of the form:

(VI) $A = K_0 \cdot d$ which signal is then amplified by an amplifier 40. The final signal is directly useable since it is directly proportional to the value of "d" which is representative of the vertical axial position of the head carried by the corresponding bimorph strip.

The multiplicative inverter element 39 and the amplifier 40 are shown as being incorporated in the demodulation circuit $35_i$ for reasons of clarity and for simplification purposes, even though strictly speaking these two components are not directly related to the operation of demodulation.

In the third embodiment, shown in FIG. 5, the generator 33 delivers input signals (or carrier signals) at a common frequency and applies them to the first input of each demodulation circuit $35_i$ and to each of the bimorph strips. This embodiment differs from those shown in FIGS. 3 and 4 in that the modulated output signals are distributed by splitting the fixed annular plate 32 into a succession of N annular arcs $32_1, \ldots, 32_N$, where N is equal to the number of bimorph strips. Each of the arcs extends over the same angle at the center and they are disposed around a common circumference. It should be understood that this embodiment assumes that the bimorph strips are uniformly angularly distributed. In FIG. 5, the space between two consecutive arcs has been exaggerated. In fact, a few microns suffice for a bimorph strip having a width of several millimeters. Each arc $32_i$ provides an output signal conveying information about the position of the particular bimorph strip facing it at that moment. Demultiplexing means (known per se) DMULT dispose between each arc $32_i$ and each demodulation circuit $35_i$ redistribute the data coming from each arc in such a manner that each circuit $35_i$ always receives data relating to the same given bimorph strip.

This third embodiment means that only one frequency is needed for the detection signals.

In order to take account of variations in the permitivity of air (which varies as a function of temperature, salinity, and humidity) given that the permitivity ε is a term in the equation for calculating the distance "d" between the plates, the device in accordance with the invention advantageously includes a correction circuit which is described below with reference to FIGS 9 and 10. These figures show an embodiment of the invention which is provided with a correction circuit and which corresponds to the embodiment shown in FIGS. 4 and 8.

The correction circuit (see FIG. 10) comprises a reference capacitance $C_{ref}$ and a demodulation circuit 43 whose first input $e_1$ receives the carrier detection signal (from the generator 33) and whose second input $e_2$ is connected to the first plate of the reference capacitance. The second plate of this capacitance is connected via phase shifter DPHI to the generator 33.

The circuit 43 includes a multiplier 36, an amplifier 37, and a lowpass filter 38, with these three items being similar to those in the demodulation circuit $35_i$ which are each associated with a measurement capacitance $C_m$. The output from the circuit 43 is connected to an adjustment input to each of the inverter elements 39 of the respective circuit $35_i$.

Figure 9:
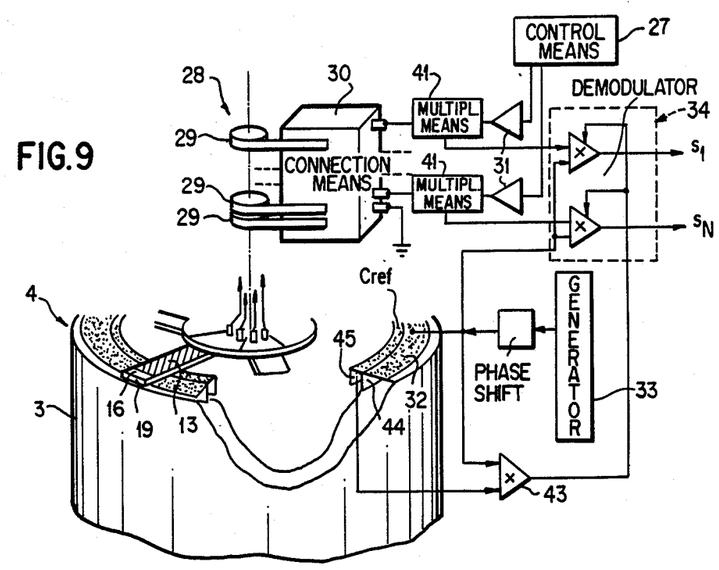
FIG. 9 is a perspective view of the FIG. 4 embodiment having a permitivity correction circuit added thereto.
Figure 10:
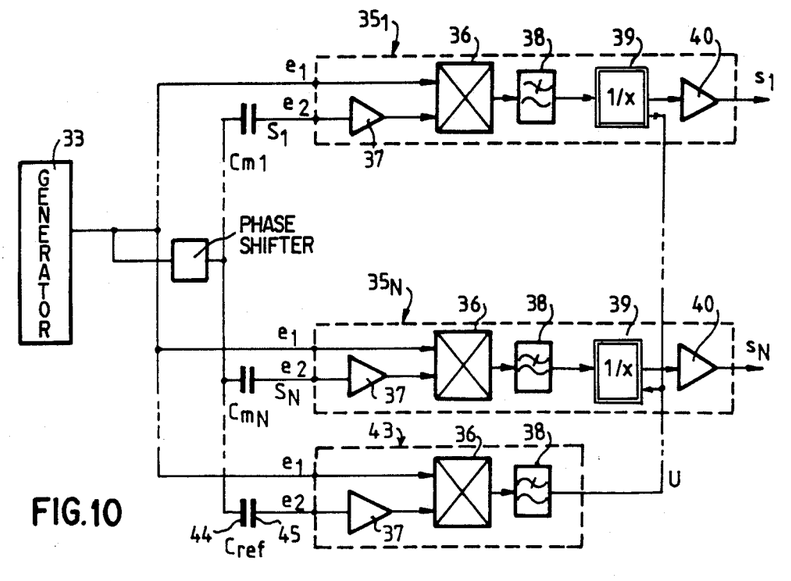
FIG. 10 is a block diagram showing the relationship of the demodulation circuits relating to the variable measuring capacitances, and to the reference capacitance.

FIG. 9 shows an embodiment of the reference capacitance $C_{ref}$ having two concentric cylindrical plates which are coaxially disposed with the drum. The first plate 44 is constituted by a cylindrical strip of diameter equal to the inside diameter of the annular plate 32 of the measurement capacitances $C_m$. This plate 44 is constituted by a flange (extending generally cylindrically about the axis) on the annular plate 32. The second cylindrical plate 45 is placed opposite the plate 44 at a given radial distance therefrom.

Like the N measurement capacitances $C_m$, the modulated signal from the plate 45 of the reference capacitance $C_{ref}$ is subjected to synchronous amplitude demodulation by the circuit 43 which delivers a correction signal for application to each of the multiplicative inverter elements 39. As a result a correction factor relating to the value of ε applicable in equation (V) is applied in order to keep track of variations in ε of the ambient air in which the measurement capacitances $C_m$ are located.

Advantageously, the signal carrying data relating to the distance "d" between the bimorph strip and the reference plate is injected into the bending control means 27 in order to from a servocontrol loop, as shown in FIG. 11 which shows an embodiment similar to the FIG. 4 variant. Components which are common to FIGS. 4 and 11 have the same references.

The capacitor $C_m$ represents the variable measurement capacitance. The outputs $s_1, \ldots, s_N$ from the demodulation means are connected to the bimorph strip bending control means 27 in such a manner that each bending signal (coming from the means 27) is corrected by the output signal which includes the real position of the bimorph strip.

I claim:

1. A device for detecting a position of a plurality of recording/read rotating heads for use with a magnetic recording tape in a recording/read apparatus wherein said magnetic recording/read apparatus includes (a) a cylindrical drum having a surface against which the tape is helically wound, said drum being provided with a slot in an equatorial plane of said drum, (b) control means for generating bending signals, and (c) a plurality of elongated head supports angularly distributed around an axis of said drum, each of said head supports mounted to rotate in said equatorial plane around said axis, each head support being equipped at one end with a head and being capable of bending in a direction f transverse to a direction of relative head-to-tape displacement responsive to a bending signal generated by said control means for displacing said head in said transverse direction f, said device comprising:
   a variable electrical capacitance position sensor for each of said head supports, each of said sensors including (a) a fixed plate attached to said drum and common to each of the sensors and (b) a moving plate fixed to a respective one of said head supports; and
   measurement means responsive to said sensors for providing a signal representative of a position of each head support, and thereby, of each head.

2. A device according to claim 1, wherein each of the head supports comprises a piezoelectric bimorph strip having one of its faces constituting the moving plate of a respective variable capacitance position sensor.

3. A device according to claim 1, wherein said head supports comprise respective piezoelectric bimorph strips each having one face that constitutes the moving plate of a respective variable electrical capacitance position sensor.

4. A device according to claim 1, wherein the measurement means comprise an alternating electric signal generator for generating a "carrier" input signal which is applied to one of the plates of a respective variable electrical capacitance position sensor, together with demodulation means having one input connected to an output of the generator and having another input connected to the other plate of said respective variable capacitance position sensor.

5. A device according to claim 4, wherein the generator generates as many signals at different frequencies as there are head supports and applies each of said signals to a respective one of the supports, and wherein the demodulation means comprises a demodulation circuit for each frequency associated with a head support.

6. A device according to claim 4, in which the head supports are uniformly distributed annularly, and wherein the fixed plate is constituted by a succession of annular arcs with there being the same number of arcs as there are supports, said arcs being disposed end-to-end and each subtending the same angle at the center, the generator delivering a carrier input signal having a predetermined frequency, and the measurement means including a demultiplexer circuit for signals coming from each of the annular arcs.

7. A device according to claim 4, wherein the generator generates a carrier input signal of a predetermined frequency and is connected to the fixed plate, the demodulation means including a demodulation circuit for each head support.

8. A device according to claim 7, wherein the measurement means include a frequency multiplexer circuit for conveying said bending signal to each of the head support in one direction over bending signal transmission means, and for conveying an output signal from the moving plate of a respective variable electrical capacitance position sensor in the opposite direction over said bending signal transmission means, said output signal containing position information relating to the moving plate of said respective variable electrical capacitance position sensor for transmission to a corresponding one of said demodulation circuits.

9. A device according to claim 7, wherein the measurement means include a 90° phase shifter circuit to which either of the carrier input signal and a modulated output signal from respective ones of said sensors is applied.

10. A device according to claim 1, wherein the fixed plate is constituted by an annular metal layer which is coaxial with the drum and which is disposed on one of bottom and top faces of said slot, and facing a path of a rotating head support.

11. A device according to claim 1, including a correction circuit for taking account of variations in the permitivity of ambient air, said circuit comprising a reference capacitance placed in the vicinity of one of said variable electrical capacitance position sensor, said circuit being connected to said measurement means to deliver a correction signal which is applied thereto.

12. A device according to claim 1, wherein the device supplies an output signal to the control means.

13. A device for detecting a position of a recording/read rotating head for use with a magnetic recording tape in a recording/read apparatus, wherein said recording/read apparatus includes (a) a cylindrical drum having a surface against which the tape is helically wound, said drum being provided with a slot in an equatorial plane of said drum, (b) control means for generating bending signals, and (c) an elongated head support mounted at one end to rotate in said equatorial plane around an axis of said cylindrical drum, said head support being equipped at its other end with a head and being capable of bending in a direction f transverse to a direction of relative head-to-tape displacement responsive to a bending signal generated by said control means for displacing said head in said transverse direction f; said device comprising:
   a variable electrical capacitance position sensor for said head support including (a) a fixed plate attached to said drum and common to said sensor, said fixed plate including an annular metal layer coaxial with said drum and disposed on one of the bottom and top faces of said slot facing a path of said head support, and (b) a moving plate fixed to said head support; and
   measurement means responsive to said sensor for providing a signal representative of a position of said head support, and thereby, of said head.

* * * * *